J. A. DICKEL.
HAY PRESS.
APPLICATION FILED FEB. 23, 1916.

1,227,761.

Patented May 29, 1917.
6 SHEETS—SHEET 4.

UNITED STATES PATENT OFFICE.

JAMES A. DICKEL, OF OTTUMWA, IOWA, ASSIGNOR OF ONE-HALF TO FRANK A. DICKEL, OF OTTUMWA, IOWA.

HAY-PRESS.

1,227,761.

Specification of Letters Patent.

Patented May 29, 1917.

Application filed February 23, 1916. Serial No. 79,993.

*To all whom it may concern:*

Be it known that I, JAMES A. DICKEL, a citizen of the United States, residing at Ottumwa, in the county of Wapello and State of Iowa, have invented new and useful Improvements in Hay-Presses, of which the following is a specification.

This invention is an improved baling press especially adapted for baling hay and other like material and of the kind in which bales are formed one behind the other in a press box or baling chamber and each bale is in turn ejected by the action of the plunger in pressing another bale.

One object of the invention is to effect improvements in the construction of the plunger.

Another object is to provide improved means for operating the plunger.

Another object is to provide improved means for reversing the strokes of the plunger.

Another object is to provide a tamper which is operated simultaneously with the plunger and also serves to automatically arrange the blocks between the bales.

Another object is to provide an improved press which may be fed either from the top or from the side.

Another object is to provide the press with a feed table and with means for feeding the hay or other material to the press box.

Another object is to provide means for automatically operating the hay feeders.

Another object is to provide a tucker to tuck the hay down against the end of the bale and enable the blocks to be pressed behind the bales without the necessity of causing the plunger to deliver extra strokes.

The invention consists in the construction, combination and arrangement of devices hereinafter described and claimed.

In the accompanying drawings:—

Figure 1ª is a detail perspective view of the tucker.

Fig. 2 is a similar view showing the opposite side thereof.

Fig. 4ª is a detail perspective view of the feeder and of the block carrier.

Fig. 8ª is a detail view of the inner side of the feed pulley.

The press box or baling chamber is indicated at 1, is arranged for the removal of the bales from the outer end thereof and is provided at a suitable point with a feed opening 2 on the upper side, for use when the press is fed from the top and is also provided with a feed opening 3ª on one side, for use when the press is fed from the side. A door 3 is provided which may be used to close either the opening 2 or the opening 3ª. When the press is fed from the top, the door is arranged to close the opening 3ª. The door is provided with bars 3ᵇ which extend longitudinally thereof and project beyond its ends. These bars are secured on the outer side of the door and their projecting ends may be bolted either on top of or to one side of the press box, when the door is arranged in either position. A frame 4 extends from the feed end of the press box. A plunger 5 is provided on its lower side with rollers 6 which operate on the bottom of the press box and minimize the friction. The plunger is provided on its upper side with a plate 7 which extends rearwardly therefrom, said plate also has a side member 7ª which is arranged on one side of and also extends rearwardly from the plunger and moves past the side feed opening 3ª and when the press is fed from the side, said side member 7ª prevents hay or other material being pressed from getting back of the plunger. The plate 7 prevents hay or other material from getting back of the plunger when the machine is fed from the top. A lever 8 is pivotally connected to the rear of the plunger as at 9, the rear end of the said lever being pivotally connected as at 10 to a lever 11, the rear end of which is connected by a fixed pivot 12 to the frame. The levers 8 and 11 are toggle jointed levers and serve to move the plunger forwardly when their pivotally connected ends 10 are lowered and said levers are straightened out and to pull the plunger rearwardly when the pivotally connected ends 10 are elevated as will be understood.

An operating drum 13 is provided for actuating the plunger. This drum has a shaft 14 which is mounted in bearings with which the frame is provided. A chain or cable 15 is partly wound on the drum and has one end connected by a clevis 16 to the under side of the lever 8 at a point near the front end of said lever, the other end of the chain passing around the front side of a direction pulley 17 mounted in the bottom of the press box and being connected by a clevis 18 to the pivot 10, which connects the lever 8 to the lever 11. The chain is in practice provided with turn-buckles 19 or other suitable devices for varying the length of the chain and keeping the same tight. At one end of the drum is a spur gear 20 which is engaged by a pinion 21 on a counter-shaft 22. Said counter-shaft is provided at a point to one side of the frame with a pair of fixed pulleys 23—24 and also with a loose pulley 25 which is arranged between the fixed pulleys. A suitable driving pulley 26 of an engine for operating the press is connected to the pulley 23 by a straight belt 29 and to the pulley 24 by a crossed belt 30. The said belts may be shifted to the loose pulley 25, a shifter bar 31 being provided for this purpose, which is arranged at right angles to the frame, is mounted in a guide 32 in one side of the frame, has fingers for engaging the belts 29—30 and is also provided with a rack or series of rack teeth 33.

Figures 1, 1A:
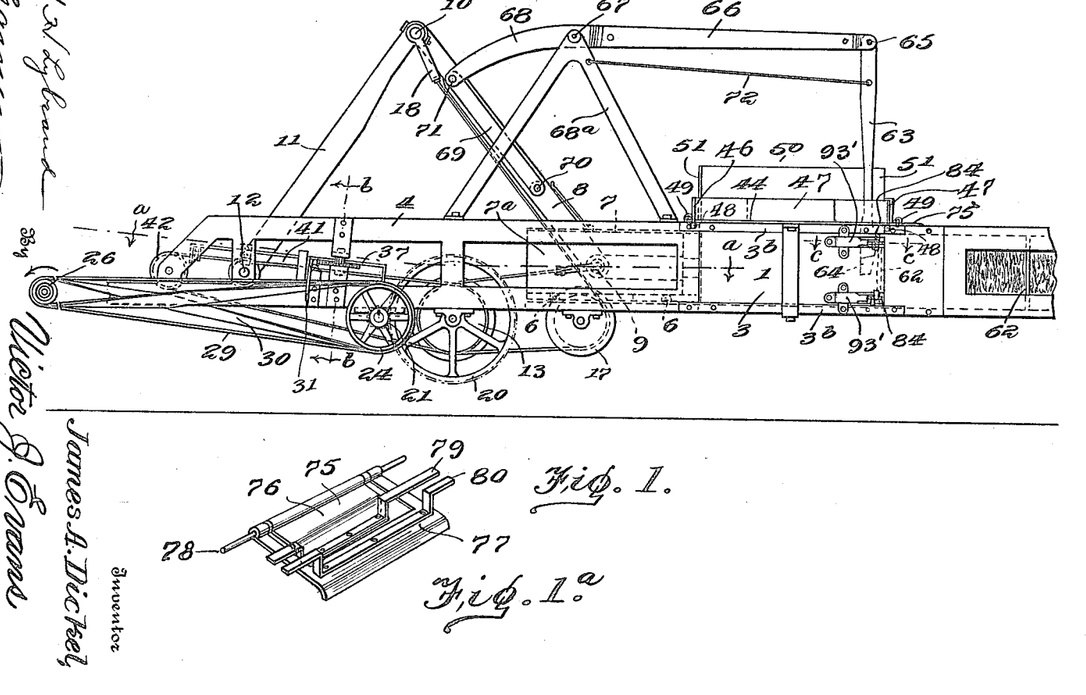
Figure 1 is a side elevation showing one side of a hay press constructed in accordance with my invention.
Figure 3:
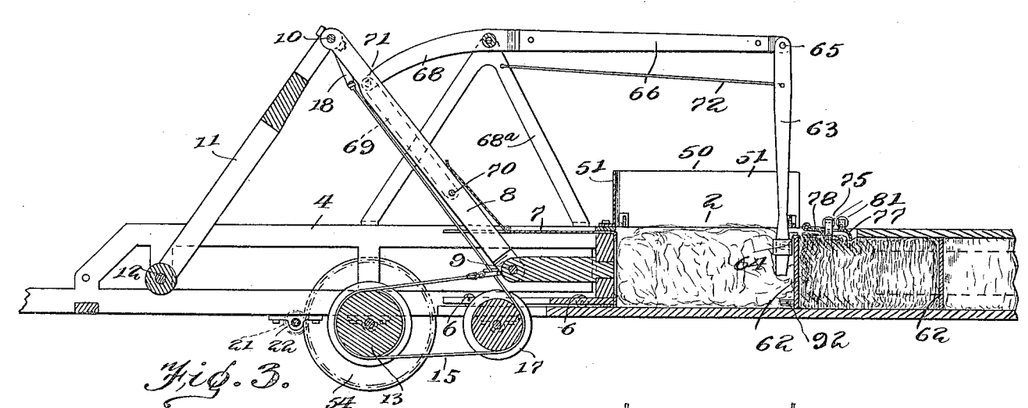
Fig. 3 is a vertical longitudinal sectional view of the same.
Figure 4:
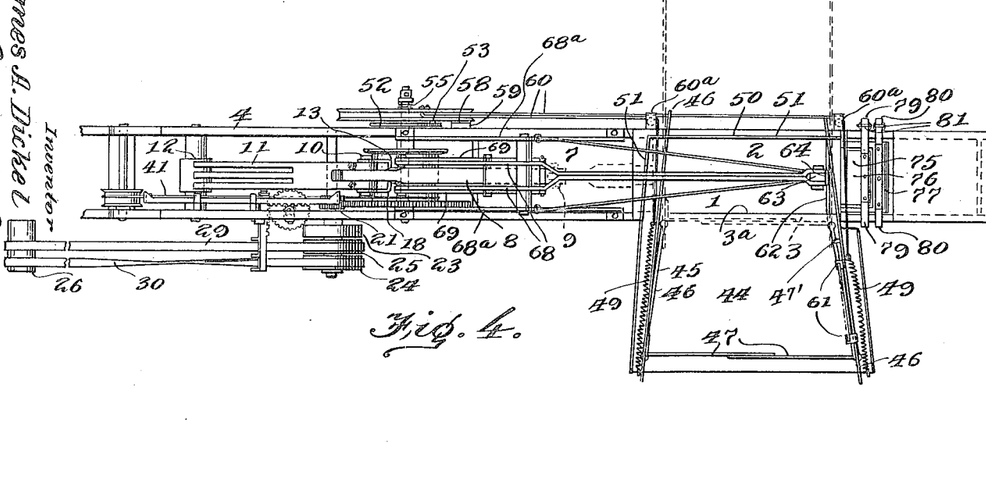
Fig. 4 is a plan of the same.
Figure 4A:
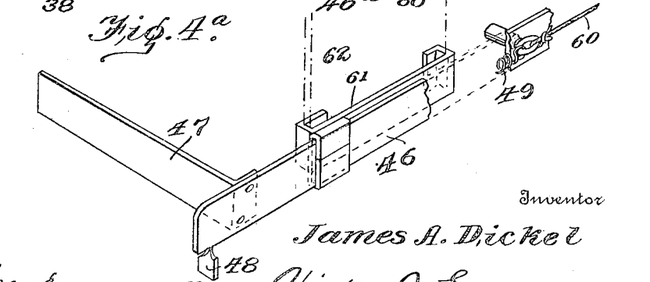
Figures 5, 6, 13:
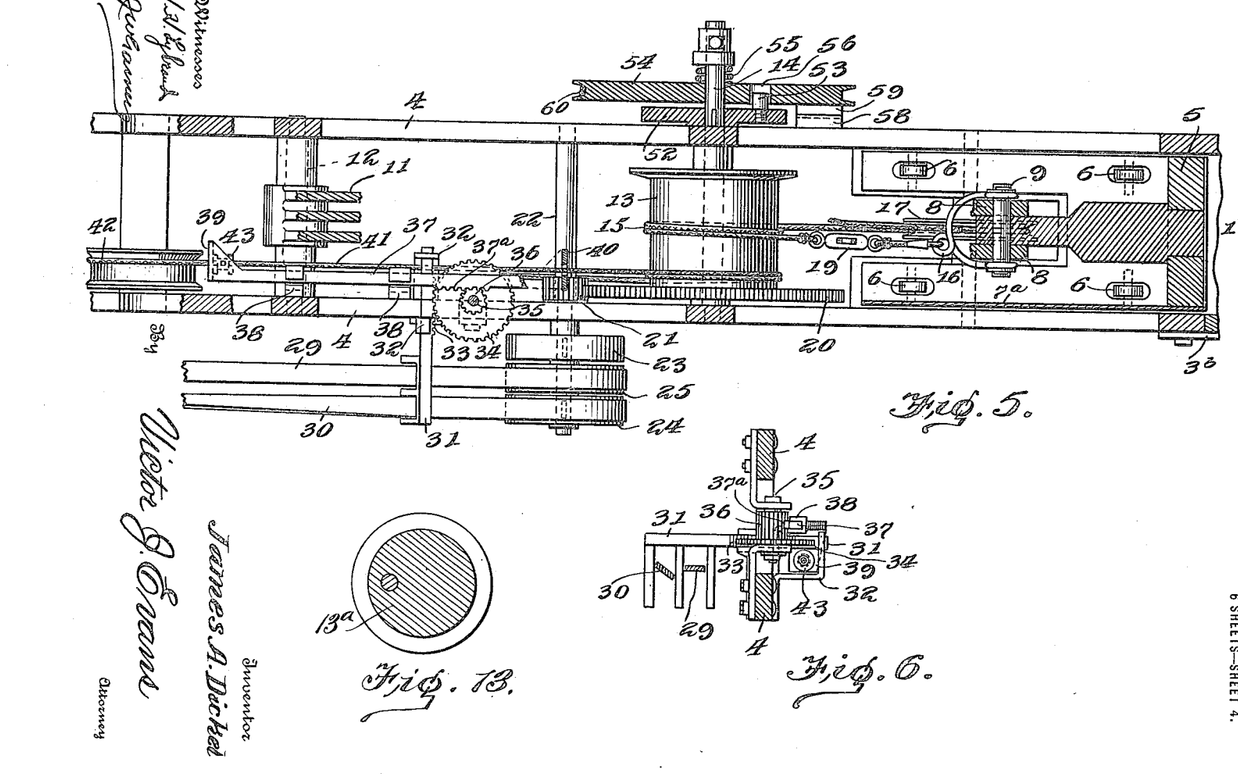
Fig. 5 is a detail horizontal sectional view of the same on the plane indicated by the line *a—a* of Fig. 1.
Fig. 6 is a transverse sectional view of the same on the plane indicated by the line *b—b* of Fig. 1.
Fig. 13 is a detail elevation of a modified construction of the drum.
Figures 6, 8, 8A:
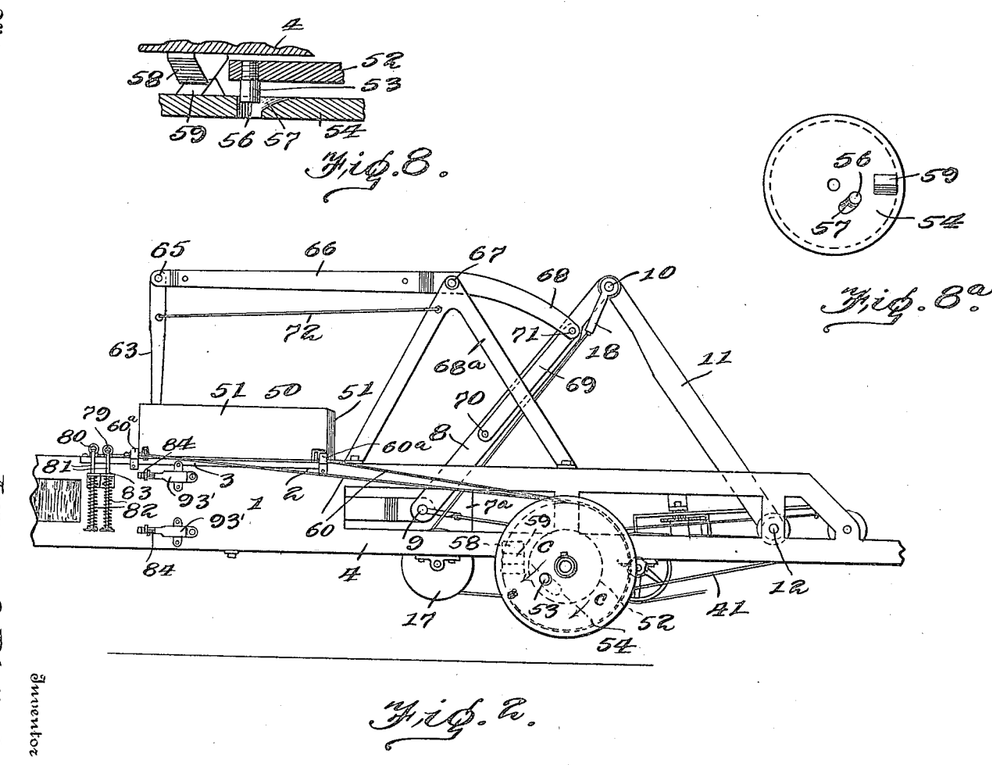
Fig. 8 is a detail sectional view on the plane indicated by the line *d—d* of Fig. 2.
Figure 7:
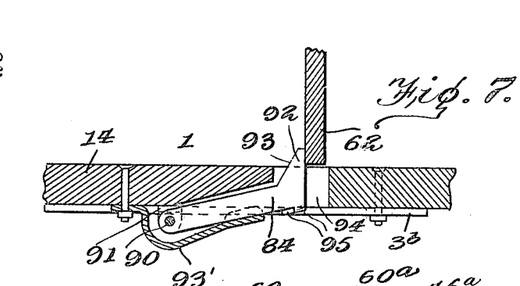
Fig. 7 is a similar view on the plane indicated by the line *c—c* of Fig. 1.

The pulley 26 is driven in the direction indicated by the arrow in Fig. 1. When the crossed belt 30 is engaged with the pulley 24 and the straight belt 29 is engaged with the loose pulley 25 the drum will be turned in the required direction to cause the chain 15 to move the plunger forwardly. When the crossed belt 30 is shifted to the loose pulley 25 and the straight belt 29 is engaged with the pulley 23, the drum will be turned in the reverse direction and hence the chain 15 will draw the plunger rearwardly, as will be understood.

Means for automatically operating the belt shifter is provided and is described as follows:—A spur gear 34 engages the rack 33 of the belt shifter bar and is mounted for revolution in one side of the frame as at 35 and a pinion 36 of less diameter than the gear 34 is also provided which is arranged centrally on said gear and rotates therewith. A reversing bar 37 is mounted in suitable guides 38 in the frame for longitudinal reciprocating movement and has a rack 37$^a$ which engages the pinion 36 and said bar 37 is provided with downturned arms 39—40 at its ends and each of which has an opening. A reversing chain 41, which is endless, is partly wound on the drum 13, is engaged with a pulley 42 and has one lead arranged to operate through the openings in the arms 39—40 of the rack bar 37 and is provided on said lead with a tappet element 43. The length of the bar 37 is such, and the parts are so proportioned, that when the plunger nears the limit of its stroke, the tappet element will engage one of the arms of the rack bar 37 and hence move said rack bar longitudinally in one direction or the other thereby causing said rack bar to coöperate with the pinion 6 in turning the spur gear 34, the latter co-acting with the rack 33 to operate the belt shifter 31 as will be understood. Hence the plunger is automatically operated and reversed.

A feed table 44 is provided which leads to the feed opening 2 and in the form of the invention shown in Figs. 1 to 8, inclusive, is arranged at the upper side of the frame, and at one side of the press box. The said table is provided with slots 45 near its sides which converge toward the feed opening of the press box. Feeders 46 are arranged for movement on the table from its outer end to its inner end and are provided with arms 47 which extend across the press box and each of which is provided at its outer end with a downturned tappet finger 48 which operates in one of the slots 45. The feeders are arranged in partial overlapping relation and owing to the provision of the converging slots 45 and the tappet fingers 48 the feeders as they move toward the feed opening of the press box also move toward each other so that they serve to apply pressure to opposite sides of the material on the feed table and to bunch the hay or other material and cause it to be fed compactly to the press box as will be understood. Springs 49 are provided to move the feeders outwardly. A fender 50 is provided which comprises a pair of right angled walls 51 one of which is on the side of the press box opposite the feeder, the other extending across the press box and to the feed table.

I will now describe means for operating the feeders so that they are caused to feed material to the press box during the reverse strokes of the plunger. The disk 52 is secured to the drum shaft 14 for rotation therewith and arranged on the rear side of the frame 1. This disk has a tappet pin 53 projecting from its outer side and arranged eccentrically. A pulley 54 is loosely mounted on the shaft 14 on the outer side of the disk 52 and is movable toward the said disk by a spring 55. The said pulley has an opening 56 for engagement by the tappet pin 53 and on the inner side of said pulley is a cam way 57 which leads to said opening. A cam 58 is on the rear side of the frame 1, at a suitable distance from the disk 52 and on the inner side of the pulley 53 is a cam 59 for engagement with the cam 58 after a partial rotation of the pulley with the disk and drum to move the pulley outwardly and thereby disengage the pin 53 from the opening 56 and hence permit the reverse rotation of the pulley. Chains or other suitable flexible elements 60 connect the pulley with the arms of the feeders and engage suitable direction pulleys 60$^a$.

The parts are so arranged that during the reverse movement of the plunger and the corresponding movement of the drum and its shaft, the pulley 54 is locked to the shaft by the pin 53 and disk and rotates with the drum shaft causing the chains 60 to be wound on said pulley and to draw the feeders inwardly over the feed table and to supply the press with material. At the end of the reverse stroke of the follower the cam 59 of the pulley engages the cam 58 on the frame and said cams move the pulley outwardly thereby disengaging it from the pin 53 whereupon the springs 49 draw the feeders outwardly and return them to their initial position at the outer end of the table and in so doing, cause the chains 60 to reversely and idly turn the pulley.

One of the feeder arms is provided with guides 61 to hold the ends of a block 62 placed in an upright position on the table. Hence when the feeders move toward the said opening of the press box the said block is carried over said opening to a position between the sides of the press box ready to be dropped into place between the finished bale and the one about to be pressed. A tamper 63 is provided and the said tamper has a foot 64 for engaging the block and pushing the latter downwardly as the tamper moves downwardly and with the material. This tamper is pivoted as at 65 to one end of a rocker lever 66. Said lever has its axle shaft or fulcrum 67 mounted in standard brackets 68$^a$ on the side walls of the frame. The rear end of the rocker lever is provided with fork arms 68 which extend on opposite sides of said lever, and links 69 are pivoted as at 70 on opposite sides of said lever and are also pivoted as at 71 to the arms 68 of the rocker lever, so that said rocker lever is operated with the lever 8 and by said links. To keep the tamper in the required vertical position and compensate for the angular movement of the rocker lever, said tamper is connected to the standard brackets 68$^a$ by rods 72.

Since the block carrier comprising the guide 61 is on one of the feeder arms, it will be understood that said carrier is moved outwardly with the feeders, by the springs 49, after the block has been dropped into position in the press box.

Stops 84 are provided to engage behind the block and prevent the latter from moving rearwardly with the plunger. These stops are arranged at opposite sides of the press box when the press is fed from the top and are arranged some above and some in the bottom of the press box when the press is fed from the side. The stops are pivotally mounted as at 90 in brackets 91. Two of these brackets are mounted or bolted on the door 14. The stops have inwardly extending lugs 92 each of which has an inclined or cam edge 93 at its outer side for engagement by the bales and blocks to permit the material constituting the bales and also permit the blocks to move rearwardly through the press box, the stops moving outwardly to permit this, and the stops are pressed inwardly by springs 93' and project through openings 94 with which the press box is provided. Each stop has lugs 95 on its outer side, said lugs preventing the stops from moving too far inwardly in the press box. Owing to the action of the springs, the stops engage behind the block and hence hold the block against reverse movement as will be understood.

Figure 9:
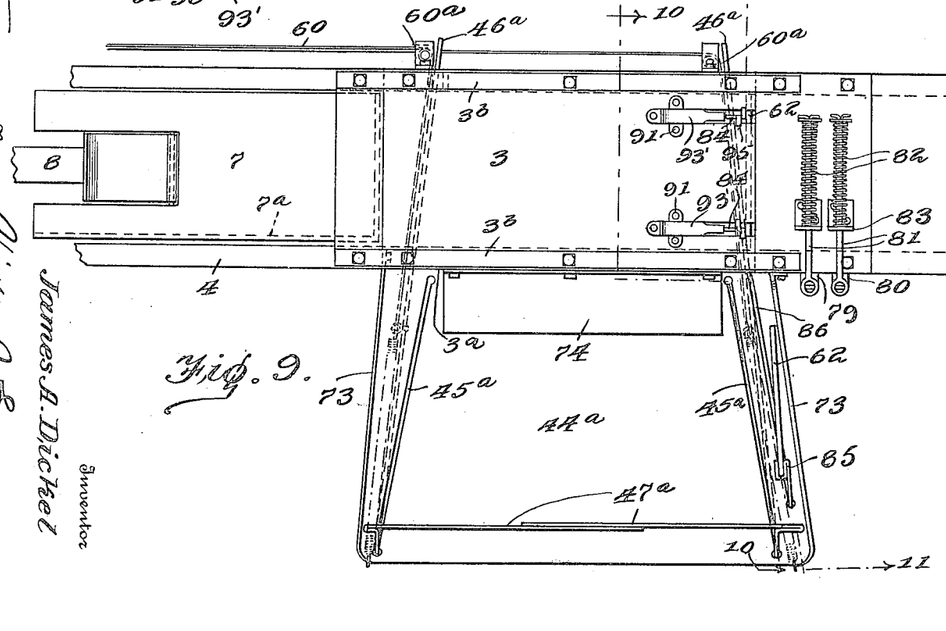
Fig. 9 is a detail plan showing a modified form of my improved hay press in which the same is adapted to be fed from one side.
Figure 10:
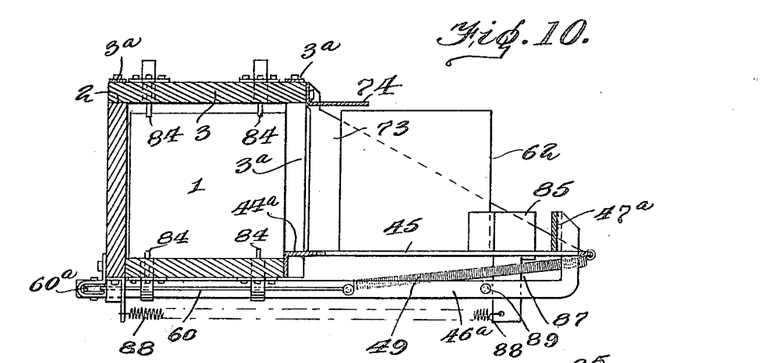
Fig. 10 is a sectional view of the same on the plane indicated by the line 10—10 of Fig. 9.
Figures 11, 12:
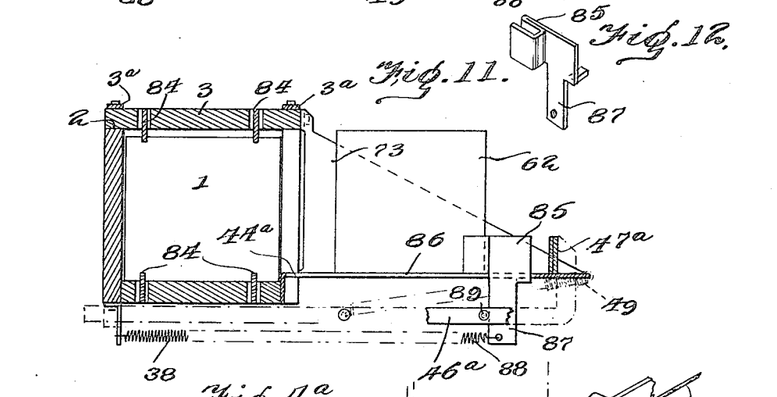
Fig. 11 is a similar view on the plane indicated by the line 11—11 of Fig. 9.
Fig. 12 is a detail perspective view of one of the block carriers.

When the press is constructed and arranged as shown in Figs. 9 to 11 inclusive, the feed opening 3$^a$ is at one side of the press box and the feed table 44$^a$ is at the lower side of said opening and slidable above the bottom of the press box. Said feed table is provided at its sides with walls 73 which converge inwardly and rise to the upper side of said feed opening.

The feeders 46$^a$ are substantially of the same construction and are operated by the same means as the feeders hereinbefore described. The tamper is dispensed with in this form of the invention and a guide ledge 74 is provided which is arranged at the upper side of the said opening and serves to direct the hay through the said opening and into the feed chambers.

The block carrier 85 is guided in a slot 86 of the feeder table which slot is at the outer side of and parallel with one of the slots 45$^a$ and said block carrier has a downwardly extending arm 87. A coiled spring 88 has one end attached to said arm and the other end attached to the opposite sides of the press frame and said spring acts to draw the block carrier inwardly on the feed table and to arrange the block in the feed chamber before the hay which is carried to the feed chamber by the feeders. Nearest the block carrier, the arm 47 of the feeder is provided with a stop stud 89 which engages the depending arm 87 of the block carrier on the reverse or outward movement of the feeders and hence pulls the block carrier back to its initial position.

The block is retained in place in the press box by the inner end of the feed table, which, as before stated, is slightly above the bottom of the press box. The parts are so timed that the block starts toward the feed chamber as soon as the plunger is far enough back to admit the block and is held in position until the return of the coacting feeder arm. The said plate 7ᵃ of the plunger prevents hay or other material being pressed from getting back of the plunger as the latter moves past the feed opening 3ᵃ as hereinbefore described.

The press is provided with a tucker 75 to tuck the hay down against the end of the bale and enable the blocks to be pressed behind the bales without the necessity of causing the plunger to deliver extra strokes. This tucker is arranged in the press box at one side and comprises a pair of members 76—77 which are here shown as independently pivotally mounted on a rod 78 and as respectively provided at their free ends with arms 79—80 to which links 81 are connected, the links being arranged on the outer sides of the press box. Coiled springs 82 are arranged at one side of said links and engage the outer ends of the links and also engage guides 83 on the sides of the press box so that the coiled springs exert their tension on the links to cause the latter to hold the tucker elements normally in the part of the bale being formed so that the tucker elements engage the hay and tuck the same downwardly against the end of the plunger and coact with the pivoted stops 84 in engaging behind the bale and holding it in pressed condition during the reverse strokes of the plunger.

The front member 76 of the tucker is concave so that it serves to turn the hay downwardly below the top of the plunger and cause all of the discharge to be compressed and thus make a smoother bale. The rear member 77 of the tucker turns the hay down close to the end of the bale. The two tucker members operate independently of each other, insuring a more perfect tuck and smoother bale. The tucker is arranged at the top of the press when the latter is fed at the top and is arranged at one side of the press when the press is fed at said side.

The drum 13 is here shown as having a centrally arranged shaft. The drum may, however, be mounted eccentrically if desired as shown at 13ᵃ in Fig. 13 to secure fast motion in withdrawing the plunger and slow motion in imparting compressing stroke to the plunger as will be understood. The cable which connects the drum and the toggle jointed levers is here shown as having one lead engaged with the direction pulley 17. This pulley may be dispensed with if desired. Other modifications may also be made without departing from the spirit of my invention and within the scope of the appended claims.

Having described the invention, what is claimed is:

1. In a press of the class described, a press box, a plunger, toggle jointed levers, one pivotally connected to the plunger and the other having a fixed pivot, a drum, a chain partly wound on the drum and having its ends connected respectively to the plunger and to the pivotally connected end of the lever, and means to rotate the drum first in one direction and then in the reverse direction.

2. In a baling press, the combination of a press box, a plunger, operating means for the plunger including a drum, an endless belt operated by the drum and having a tappet element, a reversing bar mounted for reciprocating movement and having arms at its ends in the path of said tappet, said reversing bar being provided with a rack, a pinion engaged by said rack, a second pinion revoluble with the first-named pinion, a belt shifter having a rack engaged by the second pinion, a counter shaft geared to the drum, a pair of pulleys fast to the counter shaft, a loose pulley between said fast pulleys, a longitudinal power pulley and belts respectively engaged by the belt shifter and connecting said longitudinal pulley and two of the pulleys on the counter shaft, one of said belts being crossed, each belt being adapted to be shifted from one of the fast pulleys to the loose pulley.

3. In a baling press of the class described the combination of a press box, a plunger, means including a revoluble element, to operate the plunger, a pulley loose on said revoluble element, means to alternately lock said pulley to said revoluble element for partial rotation therewith and to then release said pulley therefrom, a feed table, feeders movable on said table toward and from the press box, springs to move said feeders outwardly on the said feed table and operating cords connecting the feeders to said pulley and coacting with the pulley to move the feeders toward the press box while the same is revolving with said revoluble element.

4. In a baling press of the class described, a feed table, feeders mounted on the feed table for movement toward and from the press and means to operate said feeders simultaneously with the press, the feed table being provided with slots which converge toward the press and the feeders being arranged in overlapping relation and having guide means operating in said slots to move the feeders toward each other while they are moving toward the press.

5. In a baling press of the class described, a press box, a plunger, a rocking element connected to and operating with the plunger, a tamper operated by the rocking lever, a feed table at one side of the press box, feeders mounted on the feed table for movement toward and from the press box, operating means for the feeders, and block carrying means on one of the feeders, said tamper having means to engage the block and arrange the same in the press box.

6. In a baling press, a press box, a plunger, means to operate the plunger, and a tucker in one side of the press box.

7. In a baling press, a press box, a plunger, means to operate the plunger, and a tucker in one side of the press box, said press box also having a feed opening in said side.

8. In a baling press, a press box, a plunger, means to operate the plunger, and a tucker in one side of the press box, and comprising a pair of independently pivotally mounted members arranged one in advance of the other.

9. In a baling press, a press box, a plunger, means to operate the plunger, and a tucker in one side of the press box, and springs to normally hold the tucker in engaged position.

10. In a baling press, a press box, a plunger, means to operate the plunger, and a concave tucker in one side of the press box.

11. In a baling press, a press box, a plunger means to operate the plunger, and a tucker in one side of the press box and comprising a pair of independently pivotally mounted members arranged one in advance of the other, and springs to normally hold the members of the tucker in engaged position, the front tucker member being concave and serving to turn the hay downwardly below the top of the plunger, the rear tucker member serving to turn the hay down close to the end of the bale.

12. In a baling press of the class described, a press box, a plunger, a feed table at one side of the press box, feeders mounted on the feed table for movement toward and from the press box, operating means for the feeders, a block carrier, a spring to move the block carrier to the press box, ahead of the feeders, and means carried by one of the feeders to move the block carrier outwardly with said feeder.

In testimony whereof I affix my signature in presence of two witnesses.

JAMES A. DICKEL.

Witnesses:
E. K. DAUGHERTY,
FRANK DICKEL.

Copies of this patent may be obtained for five cents each, by addressing the "Commissioner of Patents, Washington, D. C."